US012499862B2

(12) United States Patent
Miwa et al.

(10) Patent No.: US 12,499,862 B2
(45) Date of Patent: Dec. 16, 2025

(54) ENHANCING PERFORMANCE OF SYSTEMS THAT ABSORB VIBRATIONS AND/OR FLEXURAL WAVES BY CONSIDERING ADHESIVE PROPERTIES

(71) Applicants: Toyota Motor Engineering & Manufacturing North America, Inc., Plano, TX (US); Toyota Jidosha Kabushiki Kaisha, Toyota (JP)

(72) Inventors: Tomohiro Miwa, Toyota (JP); Miki Nakahara, Toyota (JP); Xiaoshi Su, Ann Arbor, MI (US); Debasish Banerjee, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 287 days.

(21) Appl. No.: 18/453,526

(22) Filed: Aug. 22, 2023

(65) Prior Publication Data
US 2025/0069575 A1    Feb. 27, 2025

(51) Int. Cl.
*G10K 11/172*    (2006.01)
(52) U.S. Cl.
CPC ................ *G10K 11/172* (2013.01)
(58) Field of Classification Search
CPC .................................. G10K 11/172
USPC ........................................ 181/208
See application file for complete search history.

(56) References Cited

U.S. PATENT DOCUMENTS

| | | | |
|---|---|---|---|
| 4,373,608 A * | 2/1983 | Holmes | F16F 7/10 181/208 |
| 4,736,701 A * | 4/1988 | Kondo | B63B 3/70 114/340 |
| 5,714,917 A | 2/1998 | Ella | |
| 6,478,110 B1 * | 11/2002 | Eatwell | G10K 11/16 181/207 |
| 7,828,113 B1 * | 11/2010 | Dao | F16F 7/08 181/207 |
| 8,018,127 B2 | 9/2011 | Kikushima et al. | |
| 9,166,554 B2 | 10/2015 | Yamada | |
| 9,748,922 B2 | 8/2017 | Ishino et al. | |
| 9,837,982 B2 | 12/2017 | Il et al. | |
| 10,050,602 B2 | 8/2018 | Nguyen et al. | |
| 11,158,299 B2 * | 10/2021 | Chunren | G10K 11/162 |
| 11,333,215 B2 * | 5/2022 | Lammi | B64C 11/008 |

(Continued)

FOREIGN PATENT DOCUMENTS

DE    102014207852 A1 * 10/2014 ............ B32B 21/13
JP    2016109283 A       4/2019

OTHER PUBLICATIONS

Translation of DE102014207852 (Year: 2025).*

(Continued)

*Primary Examiner* — Forrest M Phillips
(74) *Attorney, Agent, or Firm* — Christopher G. Darrow; Darrow Mustafa PC

(57) ABSTRACT

Disclosed are systems for absorbing and/or isolating vibrations and/or flexural waves acting upon a structure using scatterers. In one example, a system for absorbing a flexural wave acting upon a structure includes a pair of scatterers adhered to the structure using an adhesive having a property that is based on a reduction of the flexural wave at a peak frequency by the pair of scatterers.

20 Claims, 4 Drawing Sheets

(56) References Cited

U.S. PATENT DOCUMENTS

| | | | |
|---|---|---|---|
| 11,524,637 B2* | 12/2022 | Chang | B60R 13/0884 |
| 11,688,379 B2* | 6/2023 | Lee | G10K 11/175 |
| | | | 181/286 |
| 12,080,264 B2* | 9/2024 | Su | G10K 11/172 |
| 12,300,207 B2* | 5/2025 | Li | G10K 11/36 |
| 2007/0210879 A1 | 9/2007 | Cardona et al. | |
| 2009/0100925 A1 | 4/2009 | DiFoggio et al. | |
| 2011/0227450 A1 | 9/2011 | Yamazaki | |
| 2011/0227660 A1 | 9/2011 | Mikami | |
| 2020/0143787 A1* | 5/2020 | Tomimatsu | G10K 11/172 |
| 2021/0193101 A1* | 6/2021 | Sugiura | B32B 27/40 |

OTHER PUBLICATIONS

Basu et al. "Microelectromechanical resonators for radio frequency communication applications." Microsystem technologies 17 (2011): pp. 1557-1580.

Cao et al. "Perfect absorption of flexural waves induced by bound state in the continuum", Extreme Mechanics, Elsevier, Letters 47, 101364 (2021) pp. 1-17.

Ji et al. "Investigations on flexural wave propagation and attenuation in a modified one-dimensional acoustic black hole using a laser excitation technique", Mechanical Systems and Signal Processing 104, (2018) pp. 19-35.

Li et al. "A self-adaptive metamaterial beam with digitally controlled resonators for subwavelength broadband flexural wave attenuation", Smart Materials and Structures 27, 045015, (2018) pp. 1-13.

Liu et al. Design guidelines for flexural wave attenuation of slender beams with local resonators, Physics Letters A 362, (2007) pp. 344-347.

Li et al. "An active meta-layer for optimal flexural wave absorption and cloaking", Mechanical Systems and Signal Processing 149, 107324 (2021) pp. 1-13.

Cao et al., "Flexural wave absorption by lossy gradient elastic metasurface", Journal of the Mechanics and Physics of Solids 143, (Oct. 2020) 104052, pp. 1-59.

Chen et al., "A Programmable Metasurface for Real Time Control of Broadband Elastic Rays." Smart Materials and Structures 27, (2018) 115011, pp. 1-19.

D. Lapin, "A monopole-dipole resonator for flexural waves in a rod," Acoustical Physics 50, 77 80 (2004).

* cited by examiner ian ENHANCING PERFORMANCE OF SYSTEMS THAT ABSORB VIBRATIONS AND/OR FLEXURAL WAVES BY CONSIDERING ADHESIVE PROPERTIES

TECHNICAL FIELD

The present disclosure generally relates to systems and devices for absorbing vibrations and/or flexural waves acting upon a structure that considers the properties of the adhesives used to adhere scatterers to the structure.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Flexural waves, sometimes called bending waves, deform the structure transversely as they propagate. Flexural waves are more complicated than compressional or shear waves and depend on material and geometric properties. Airborne noises can be created by flexural waves when an object comes into contact with a structure subjected to a flexural wave. Flexural vibrations of thin structures, such as beams, plates, and shells are the most common noise source caused by flexural waves.

Traditional sound absorption methods have been utilized to reduce noise caused by flexural waves, including installing sound absorbing materials that absorb radiated sound, applying damping materials to reduce vibration, and/or adding high-mass structures to prevent the passage of vibrations. However, these traditional sound absorption methods only reduce the airborne noise and do not significantly impact the flexural wave, which is the root cause of the airborne noise.

More recently, devices have been attached to structures that can absorb the flexural waves acting upon the structure. However, the properties of adhesives utilized to attach the devices to the structures are not considered when designing such a system.

SUMMARY

This section generally summarizes the disclosure and is not a comprehensive disclosure of its full scope or all its features.

In one example, a system for absorbing a flexural wave acting upon a structure includes a pair of scatterers adhered to the structure using an adhesive having a property that is based on a reduction of the flexural wave at a peak frequency by the pair of scatterers.

In another example, a scatterer for absorbing a flexural wave acting upon a structure, the scatterer includes a pair of supports, a flexible material extending between the pair of supports, a mass connected to the flexible material, and an adhesive configured to adhere the pair of supports to the structure. The adhesive has a property that is based on a reduction of the flexural wave by the scatterer at a peak frequency.

In yet another example, a system for absorbing a flexural wave acting upon a structure includes a pair of scatterers adhered to the structure using an adhesive. Each scatterer has a pair of supports, a flexible material extending between the pair of supports, and a mass connected to the flexible material. The adhesive has a property based on reducing the flexural wave at a peak frequency by the pair of scatterers. In particular, the property of the adhesive is the stiffness of the adhesive.

Further areas of applicability and various methods of enhancing the disclosed technology will become apparent from the description provided. The description and specific examples in this summary are intended for illustration only and not to limit the scope of the present disclosure.

BRIEF DESCRIPTION OF THE DRAWINGS

The accompanying drawings, which are incorporated in and constitute a part of the specification, illustrate various systems and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described are systems for absorbing a flexural wave acting upon a structure include a pair of scatterers adhered to the structure using an adhesive. Generally, prior art solutions do not consider the properties of the adhesive when constructing the system and assume that the attachment of the scatterers to the structure is perfect. Unfortunately, in real-world applications, no attachment is perfect. The systems described herein consider the adhesive's properties to improve the system's overall real-world performance.

Figure 1:
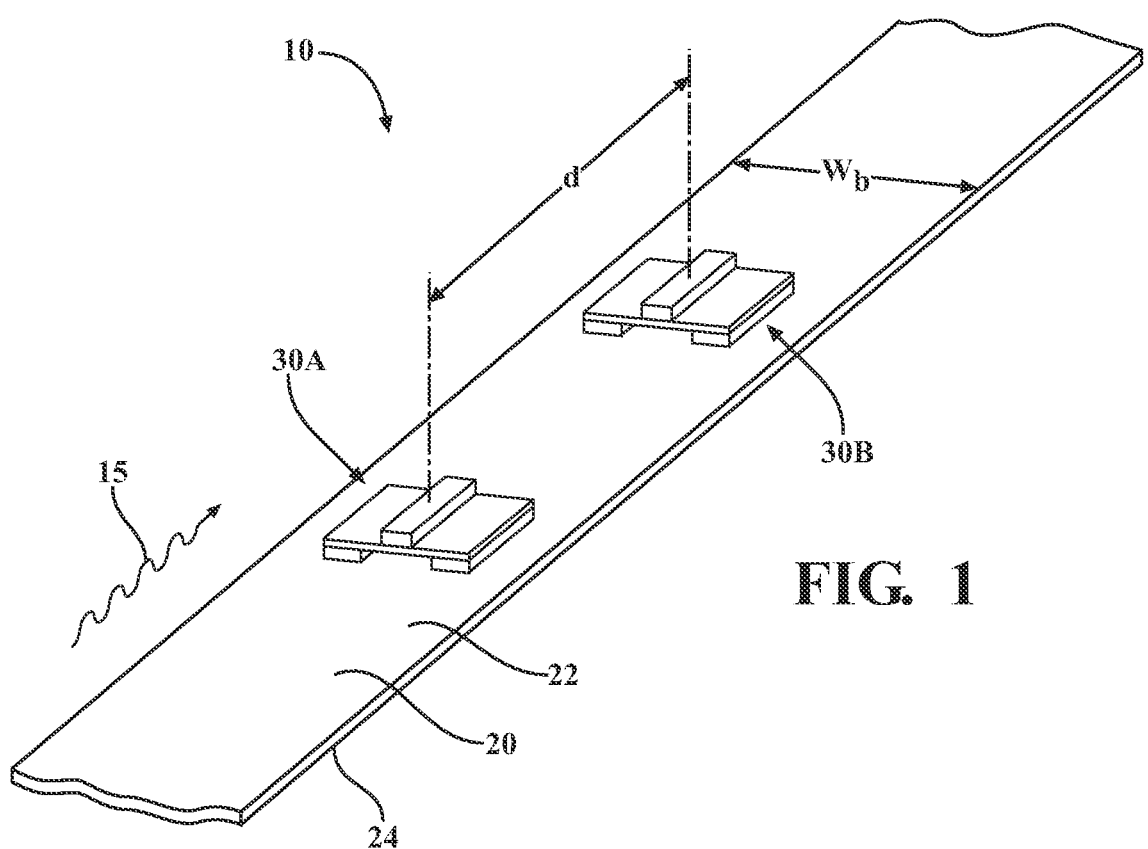
FIG. 1 illustrates a system for absorbing a flexural wave acting upon a structure that includes a pair of scatterers adhered to the structure using an adhesive having a property that is based on a reduction of the flexural wave at a peak frequency by the pair of scatterers.

Referring to FIG. 1, illustrated is one example of a system 10. As will be explained, the system 10 can substantially absorb a wave 15 acting upon the structure. In this example, the structure is in the form of a beam 20. However, it should be understood that the structure can take other forms, such as plate or plate-like structures. The beam 20 can vary from application to application and can be made of different types of materials and have different types of dimensions, such as length, width, and thickness. Generally, the longer portion of the beam is the length, while the shorter portion of the beam is the width $w_b$.

The beam 20 includes a top side 22 and a bottom side 24 that generally oppose one another. In this example, a pair of scatterers, including a first scatterer 30A and a second scatterer 30B, are disposed on the top side 22 of the beam 20. Generally, the first scatterer 30A and the second scatterer 30B are disposed on the beam 20 in a substantially similar direction of travel of the wave 15 acting upon the beam 20. In some cases, the direction that the first scatterer 30A and the second scatterer 30B are disposed on the beam 20 may be such that they are substantially similar to a direction defined by the length of the beam 20.

As will be explained in greater detail later, the first scatterer 30A and the second scatterer 30B are attached to the top side 22 of the beam 20 using an adhesive. The adhesive for attaching the first scatterer 30A and the second scatterer 30B to the beam 20 is selected by considering how different properties of the adhesive impact the performance of the system 10 when absorbing the wave 15.

The first scatterer 30A and the second scatterer 30B are generally separated from each other by a separation distance d. The separation distance d generally depends on the wavelength of the wave 15 acting upon the beam 20 and may be approximately one-quarter of the wavelength of the wave 15. Depending on the frequency range of flexural waves targeted for absorption, the separation distance d can vary accordingly.

As mentioned, the pair of the first scatterer 30A and the second scatterer 30B may be disposed of on the top side 22 of the beam 20. However, it should be understood that the pair of the first scatterer 30A and the second scatterer 30B may be alternatively disposed of on the bottom side 24 of the beam 20. Further still, one scatterer of the pair of the first scatterer 30A and the second scatterer 30B may be disposed of on the top side 22, while the other scatterer of the pair of the first scatterer 30A and the second scatterer 30B may be disposed of on the bottom side 24. The separation distance d remains the same regardless of the configuration. As mentioned before, the separation distance d depends on the frequency of the wave 15 to be absorbed and is generally one-quarter of the wavelength of the wave 15.

The first scatterer 30A and the second scatterer 30B may have a resonant frequency substantially similar to the frequency of the wave 15 acting upon the beam 20. As such, the first scatterer 30A and the second scatterer 30B will have substantially similar resonant frequencies, which are substantially similar to the frequency of the wave 15 acting upon the beam 20. However, it should be understood that the similarity of the resonant frequencies of the first scatterer 30A and the second scatterer 30B and that of the wave 15 may vary slightly (approximately 20% or less). For example, the resonant frequencies of the first scatterer 30A and the second scatterer 30B may be greater than or less than the frequency of the wave 15.

Upon incidence of the wave 15 such that it acts upon the beam 20, the vibrations of the first scatterer 30A and the second scatterer 30B will be excited. When the frequency of the wave 15 is substantially similar to the resonant frequency of the first scatterer 30A and the second scatterer 30B, the first scatterer 30A and the second scatterer 30B vibrate up and down with high amplitude. The first scatterer 30A and the second scatterer 30B are treated as one unit. The monopole and dipole resonances may occur at the same frequency by tuning the size of the first scatterer 30A and the second scatterer 30B and the distance d between them.

For example, when the first scatterer 30A and the second scatterer 30B are subject to a flexural wave, the monopole and dipole responses cancel each other in a backward direction, so there is no reflection. While the first scatterer 30A and the second scatterer 30B have constructive interference in the forward direction resulting in a scattered forward wave, the forward scattered wave cancels the incident wave in the forward direction beyond the first scatterer 30A and the second scatterer 30B. This way, the first scatterer 30A and the second scatterer 30B fully absorb the flexural wave.

Figure 2:
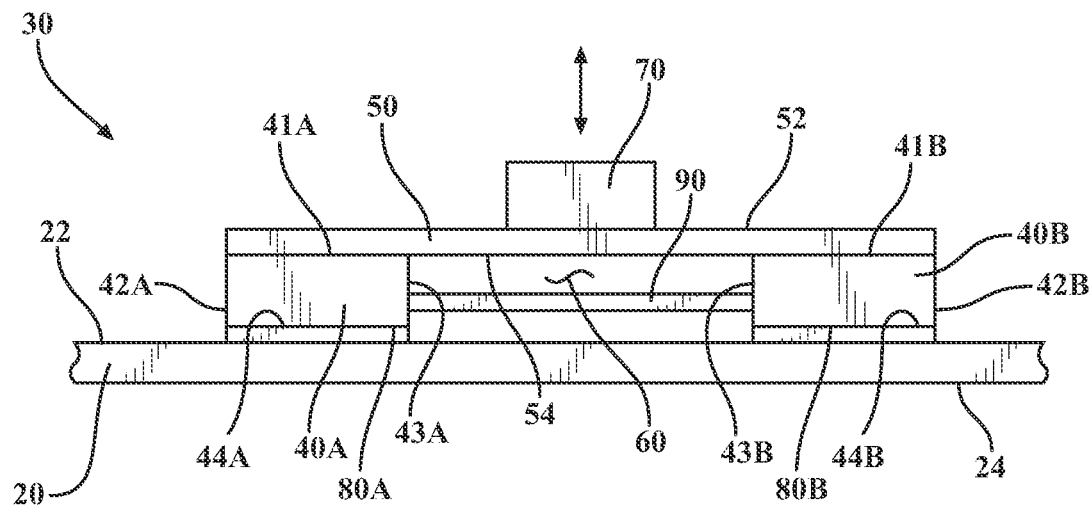
FIG. 2 illustrates a more detailed view of one example of a scatterer used in the system of FIG. 1.

FIG. 2 illustrates a more detailed view of a scatterer 30 that may be similar to the first scatterer 30A and the second scatterer 30B. It should be understood that the scatterer 30 may vary from application to application and that this is just merely one example of a type of scatterer, sometimes referred to as a resonator, which may be utilized.

In this example, the scatterer 30 includes a pair of supports 40A and 40B. Each of the supports 40A and 40B may be made of a rigid material and be cuboid. However, it should be understood that the supports 40A and 40B may take any one of a number of different forms and be made of different materials that may be less rigid. Furthermore, in this example, the shapes, dimensions, and materials are nearly identical for the supports 40A and 40B. Still, it should also be understood that the shapes, dimensions, and materials may vary between the supports 40A and 40B. Because the pair of supports 40A and 40B are cuboid, the support 40A includes sides 41A-44A, while the support 40B includes sides 41B-44B.

Figure 3:
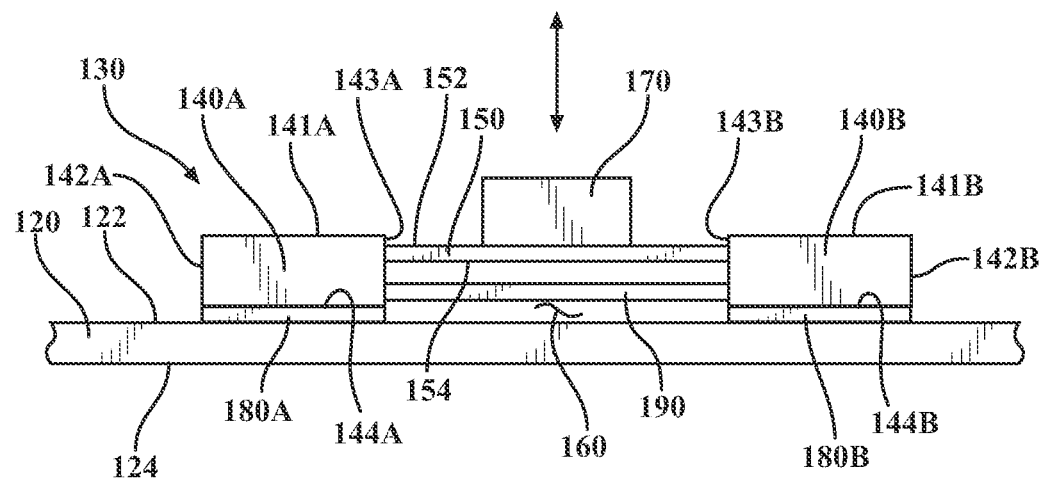
FIG. 3 illustrates a more detailed view of another example of a scatterer used in the system of FIG. 1.

A flexible material 50 with a top side 52 and a bottom side 54 extends between the two supports 40A and 40B. In this example, the bottom side 54 of the flexible material 50 is connected to and extends between the top sides 41A and 41B of the supports 40A and 40B, respectively. However, it should be understood that the flexible material 50 can extend to and from any portion of the supports 40A and 40B, an example of which is shown in FIG. 3 and will be described later in this description. A cavity is defined between the top side 22 of the beam 20, the bottom side 54 of the flexible material 50, and the sides 43A and 43B of the supports 40A and 40B, respectively.

The flexible material 50 acts as a spring and damper in a mass-spring-damper system and may be made of a flexible material, such as rubber and soft plastics, such as thermoplastic elastomers and/or thermoplastic polyurethane. However, the flexible material 50 may be made of any suitable material that allows the flexible material 50 to act as a spring and damper in a mass-spring-damper system.

A mass 70 is disposed on the top side 52 of the flexible material 50, generally in an area of the flexible material 50 unsupported by the supports 40A and 40B. Due to the flexible nature of the flexible material 50, when the beam 20 experiences vibrations and/or has flexural waves acting upon it, the mass 70 resonates. As such, the mass 70 is the mass in a spring-mass-damper system. Therefore, the resonance of the scatterer 30 is based upon the mass of the mass 70 and the spring/damper characteristics of the flexible material 50. Depending on these variations, the natural resonance of the scatterer 30 can vary considerably.

The scatterer 30 may also include one or more rigid crossbars. In this example, the scatterer 30 includes a crossbar 90 for stabilizing the position of the supports 40A and 40B with respect to each other. The crossbar 90, by stabilizing the position of the supports 40A and 40B with respect to each other, can ensure that the flexible material 50 has the appropriate tension. However, it should be understood that the scatterer 30 does not require a crossbar.

The scatterer 30 is attached to the top side 22 of the beam 20 through an adhesive. As mentioned before, the sieve is selected based on certain properties, such as the stiffness of the adhesive and how those properties impact the performance of the scatterer 30. In this example, adhesive 80A and 80B are utilized to adhere the supports 40A and 40B, respectively, to the top side 22 of the beam 20.

As mentioned before, the scatterer 30 can take a number of different forms, and the example of the scatterer 30 should be understood as just one example. For example, referring to FIG. 3, illustrated in another example of a scatterer 130. In this example, like reference numerals have been utilized to refer to like elements of the scatterer 30 shown in FIG. 2, with the exception that they have been incremented by one hundred. As such, any description of these elements for the scatterer 30 is equally applicable to the scatterer 130 unless otherwise specified.

The scatterer 130 differs from the scatter 30 in that the flexible material 150 extends between the sides 143A and 143B of the supports 140A and 140B, respectively. As such, instead of extending between the top sides 141A and 141B, the flexible material 150 extends between the sidewalls 143A and 143B.

Figure 4A:
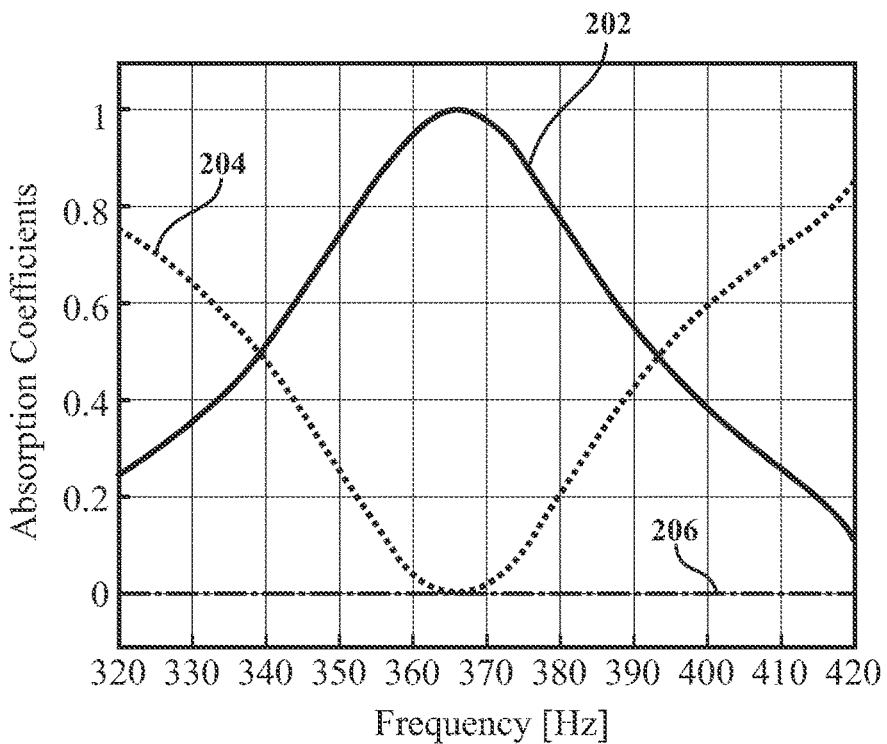
FIGS. 4A and 4B illustrate the absorption performance and vibration reduction, respectively, of a system for absorbing a flexural wave acting upon a structure that includes a pair of scatterers.

The scatterers 30 and 130, when incorporated into a system, such as the system 10 of FIG. 1, can absorb vibrations and/or flexural waves acting upon a structure, such as the beam 20. To better visualize this, reference is made to FIG. 4A, which illustrates a chart 200, indicating the absorption coefficient of the system 10 of FIG. 1. In this example, the frequency of the wave 15 acting upon the beam 20 is approximately 366 Hz. As such, the resonant frequencies of the first scatterer 30A and the second scatterer 30B may also be approximately 366 Hz. When the system 10 is configured as described, it can be seen that the transmission 204 of the wave 15 drops to almost zero at 366 Hz. The absorption 202 of the wave 60 is nearly 1.0 at 366 Hz. The reflection 206 of the wave 60 is mostly negligible.

Figure 4B:
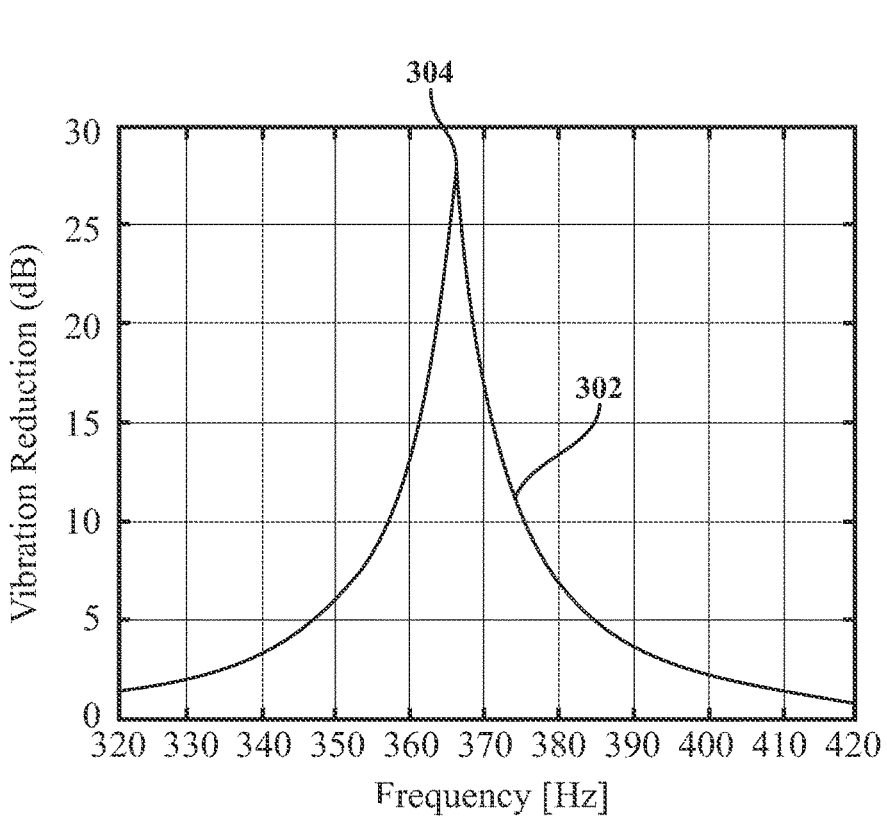

FIG. 4B illustrates another chart 300 indicating the vibration reduction 302 across a range of frequencies for the system 10. Again, the resonant frequencies of the first scatterer 30A and the second scatterer 30B are approximately 366 Hz. Vibration reduction can be seen peaking at approximately 366 Hz.

As mentioned previously, when designing a system, such as the system 10, prior art solutions would assume perfect adhesion between the scatterers and the structure to which they are attached. However, no adhesion is perfect in the real world. As such, the use of adhesives with different types of properties can impact the performance of the system 10. The type of adhesives and their properties can vary based on the frequency of the wave that is to be absorbed. Any type of adhesive can be utilized that meets the targeted properties, such as double-sided tape, wax, clay, epoxies, cyanoacrylates, polyvinyl acetate, polyurethane, etc.

Figure 5:
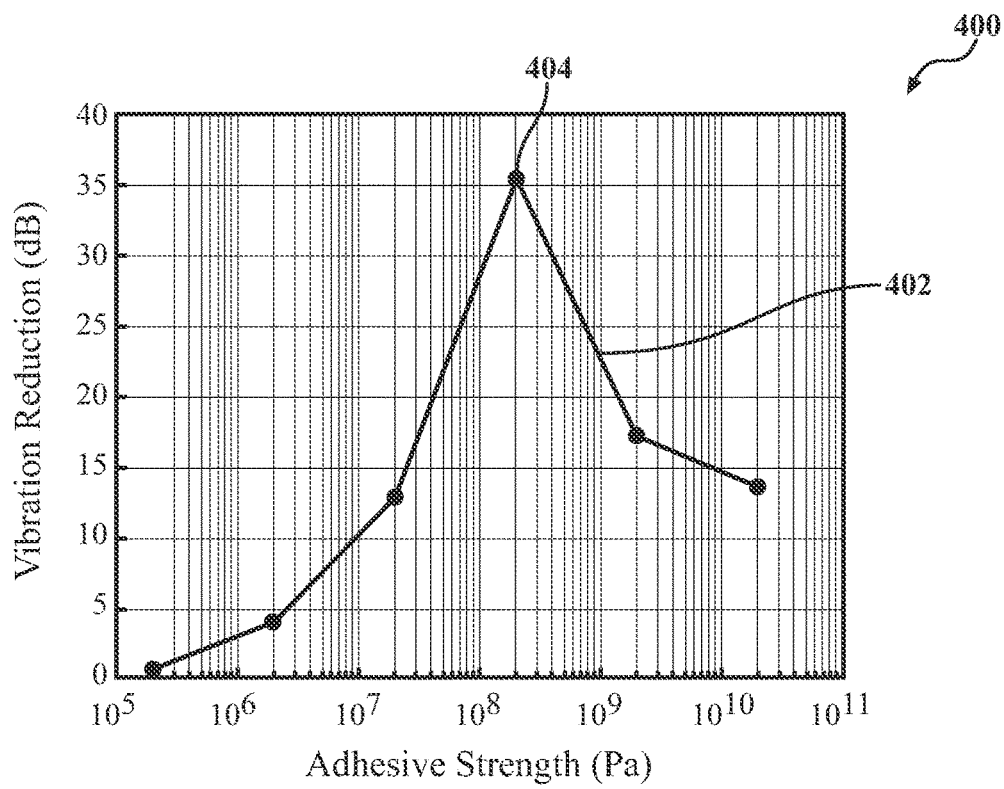
FIG. 5 illustrates the vibration reduction accomplished by the system of FIG. 1 at a predetermined frequency using adhesives having different adhesive strengths.

Referring to FIG. 5, illustrated is a chart 400, which shows the vibration reduction 402 of a 366 Hz wave as a function of the strength of the adhesive used to adhere the scatterers 30 or 130 (i.e., adhesives 80A, 80B, 180A, and/or 180B) to the beam 20. Notably, vibration reduction 402 and adhesive strength do not have a perfectly linear relationship, where the greater the adhesive strength, the greater the vibration reduction. Moreover, when the wave has a frequency of approximately 366 Hz, an optimal adhesive strength for the adhesive can be determined by observing the adhesive strength at the peak 404, which signifies peak vibration reduction. In this example, the adhesive strength for the adhesives 80A, 80B, 180A, and/or 180B should be near where the peak 404 is created.

Figure 6:
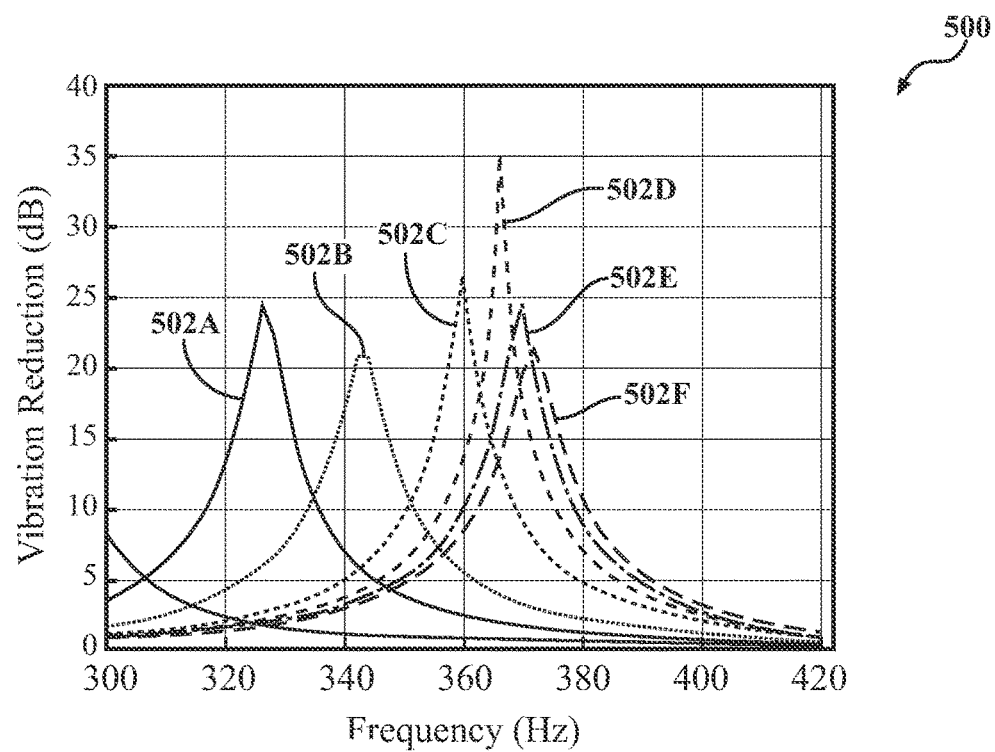
FIG. 6 illustrates the vibration reduction accomplished by the system of FIG. 1 across different frequencies with different adhesives.

FIG. 6 illustrates a chart 500 detailing the vibration reductions 502A-502F of waves using different adhesives with different stiffnesses. For simplicity's sake, the adhesive materials related to the vibration reductions 502A-502F will be referred to as Adhesives A-F, respectively. Moreover, the material property of the adhesives in this example is the stiffness of the particular adhesive. Different adhesives with different stiffnesses are better at reducing vibrations at different frequencies. The table below illustrates the peak vibration reduction frequency of different adhesives (Adhesives A-F) with different material properties, such as stiffness.

|  | Adhesive A | Adhesive B | Adhesive C | Adhesive D | Adhesive E | Adhesive F |
| --- | --- | --- | --- | --- | --- | --- |
| Peak Vibration Reduction Frequency | 325 Hz | 345 Hz | 360 Hz | 366 Hz | 370 Hz | 372 Hz |
| Stiffness | 2e6 Pa | 8e6 Pa | 2e7 Pa | 2e8 Pa | 2e9 Pa | 2e10 Pa |

As mentioned in the previous examples, if the target frequency of the wave to be absorbed is approximately 366 Hz, the adhesive should have a stiffness property of approximately 2e8 Pa. As such, if one wishes to enhance the performance of the system 10 so that it absorbs flexural waves having a frequency of approximately 366 Hz, the adhesives 80A, 80B, 180A, and/or 180B should be made using Adhesive D and/or an adhesive having a stiffness similar to Adhesive D, namely 2e8 Pa.

The preceding description is illustrative and does not intend to limit the disclosure, application, or use. The phrase at least one of A, B, and C should be construed to mean a logical (A or B or C), using a non-exclusive logical "or." Disclosure of ranges includes disclosure of all ranges and subdivided ranges within the entire range.

The headings (such as "Background" and "Summary") and sub-headings used herein are intended only for the general organization of topics within the present disclosure and are not intended to limit the disclosure of the technology or any aspect thereof. The recitation of multiple embodiments with stated features is not intended to exclude other embodiments with additional features or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in various forms. Therefore, while this disclosure includes particular examples, the true scope of the disclosure should not be so limited since other modifications will become apparent to the skilled practitioner upon a study of the specification and the following claims. Reference herein to one aspect or various aspects means that a particular feature, structure, or characteristic described in connection with an embodiment or particular system is included in at least one embodiment or aspect. The appearances of the phrase "in one aspect" (or variations thereof) are not necessarily referred to the same aspect or embodiment.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A system for absorbing a flexural wave acting upon a structure, the system comprising a pair of scatterers adhered to the structure using an adhesive having a stiffness that is correlated with a frequency of peak vibration reduction such that the stiffness is selected to maximize vibration reduction at a target frequency of the flexural wave by the pair of scatterers.

2. The system of claim 1, wherein the pair of scatterers are separated by approximately one-quarter wavelength of the flexural wave, and wherein the stiffness of the adhesive is selected to correspond to a resonant frequency associated with a wavelength of the flexural wave.

3. The system of claim 1, wherein at least one of the scatterers forming the pair of scatterers include:
   a pair of supports;
   a flexible material extending between the pair of supports; and
   a mass connected to the flexible material.

4. The system of claim 3, wherein the adhesive is disposed between the pair of supports and the structure.

5. The system of claim 3, wherein at least one of the scatterers forming the pair of scatterers further comprises a rigid crossbar extending between the supports.

6. The system of claim 1, wherein the scatterers forming the pair of scatterers have monopole and dipole resonances at approximately the same frequency.

7. The system of claim 1, wherein the scatterers forming the pair of scatterers are separated from each other by a separation distance that is approximately one-quarter of a wavelength of the flexural wave acting on the structure.

8. The system of claim 1, wherein the scatterers forming the pair of scatterers are arranged on the structure in a direction substantially similar to the direction of the flexural wave acting on the structure.

9. The system of claim 1, wherein the structure has a top side and a bottom side, wherein one of the scatterers forming the pair of scatterers is disposed on the top side of the structure and another of the scatterers forming the pair of scatterers is disposed on the bottom side of the structure.

10. The system of claim 1, wherein a resonant frequency of the scatterers forming the pair of scatterers is approximately substantially equal to or greater than a frequency of the flexural wave acting on the structure.

11. The system of claim 10, wherein the resonant frequency of the scatterers forming the pair of scatterers is approximately 5% greater than the frequency of the flexural wave acting on the structure.

12. A scatterer for absorbing a flexural wave acting upon a structure, the scatterer comprising:
    a pair of supports that are disposed apart from each other;
    a flexible material extending between the pair of supports;
    a mass connected to the flexible material; and
    an adhesive configured to adhere the pair of supports to the structure, the adhesive having a stiffness that is correlated with a frequency of peak vibration reduction such that the stiffness is selected to maximize vibration reduction at a target frequency of the flexural wave.

13. The scatterer of claim 12, further comprising a rigid crossbar extending between the supports.

14. A system for absorbing a flexural wave acting upon a structure, the system comprising:
    a pair of scatterers adhered to the structure using an adhesive having a stiffness that is correlated with a frequency of peak vibration reduction such that the stiffness is selected to maximize vibration reduction at a target frequency of the flexural wave; and
    at least one of the scatterers forming the pair of scatterers include:
        a pair of supports that are disposed apart from each other, wherein the adhesive is disposed between the pair of supports and the structure,
        a flexible material extending between the pair of supports, and
        a mass connected to the flexible material.

15. The system of claim 14, wherein at least one of the scatterers forming the pair of scatterers further comprises a rigid crossbar extending between the supports.

16. The system of claim 14, wherein the scatterers forming the pair of scatterers have monopole and dipole resonances at approximately the same frequency.

17. The system of claim 14, wherein the scatterers forming the pair of scatterers are separated from each other by a separation distance that is approximately one-quarter of a wavelength of the flexural wave acting on the structure.

18. The system of claim 14, wherein the scatterers forming the pair of scatterers are arranged on the structure in a direction substantially similar to the direction of the flexural wave acting on the structure.

19. The system of claim 14, wherein a resonant frequency of the scatterers forming the pair of scatterers is approximately substantially equal to or greater than a frequency of the flexural wave acting on the structure.

20. The system of claim 14, wherein the pair of scatterers are separated by approximately one-quarter wavelength of the flexural wave, and wherein the stiffness of the adhesive is selected to correspond to a resonant frequency associated with a wavelength of the flexural wave.

* * * * *